Nov. 6, 1928.
R. G. GUTHRIE
MICROSCOPE
Filed July 15, 1927
1,690,677
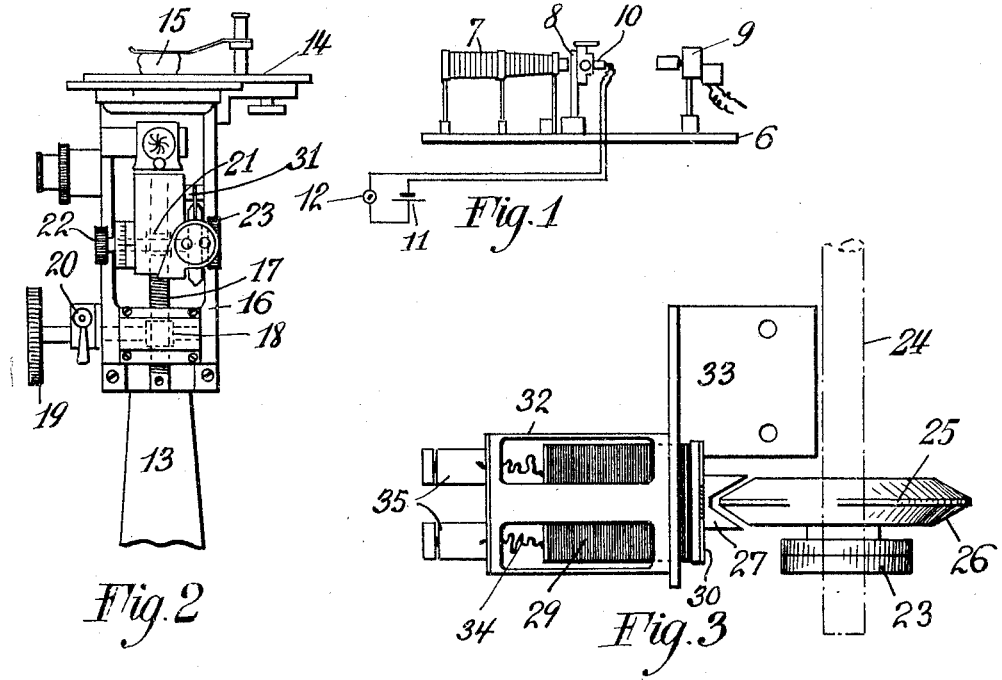
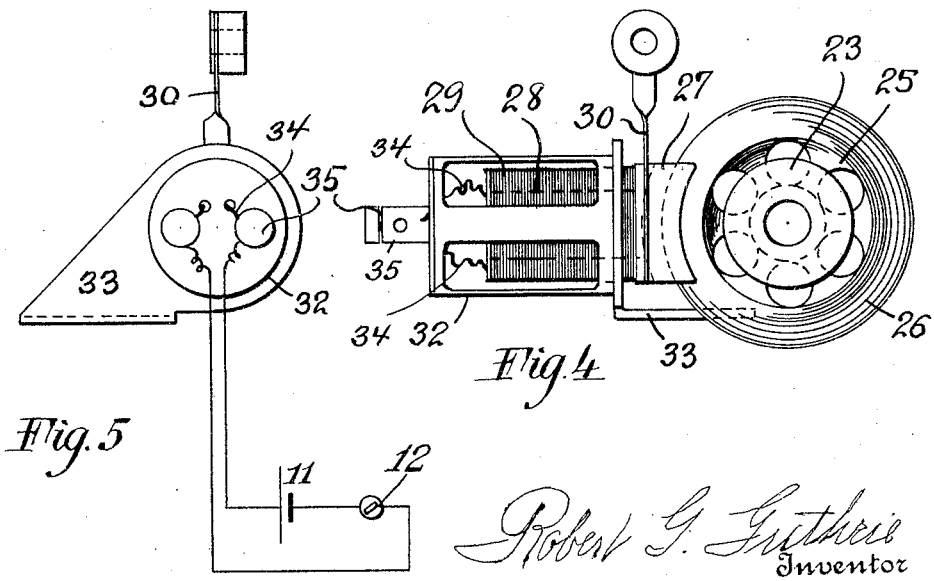
Robert G. Guthrie
Inventor
By his Attorney
Ivan E. Q. Honigsberg Patented Nov. 6, 1928.

1,690,677

UNITED STATES PATENT OFFICE.

ROBERT G. GUTHRIE, OF CHICAGO, ILLINOIS, ASSIGNOR TO E. LEITZ, INC., A CORPORATION OF NEW YORK.

MICROSCOPE.

Application filed July 15, 1927. Serial No. 205,862.

This invention relates to improvements in microscopes. More particularly this invention relates to improvements in means for locking the fine adjustment focussing mechanism to insure an unchangeable focus during operations. The object of the invention is to provide a delicate easily operable braking or locking device adapted to be attached to microscopes, cameras and other scientific apparatus used in laboratories and like places. The device is particularly useful in connection with metallographic apparatus.

It has been found in the art of micrometallography that the focus changes during the exposures for no particular reason at all. Although metallographic microscopes are usually provided with means for positively locking the coarse adjustment and are further constructed with the utmost precision to obtain unchangeable focus, nevertheless the focus changes during the operation of producing photomicrographs so that many plates are wasted and unsatisfactory results follow. It has further been found that merely mechanical perfection in the construction of the apparatus has not solved the problem.

In order to obtain accurate photomicrographs it has been attempted to re-focus the apparatus for each exposure, but this is not satisfactory as the plates are then not all scientifically correctly alike.

I have found that by providing an electromagnetic brake or lock it is possible to lock or brake the fine adjustment on the microscope so as to maintain it absolutely unchangeable for any given length of time. Accordingly my invention is embodied in an attachment in the form of an electromagnetic brake or lock adapted to be easily and quickly attached to a microscope, camera or other apparatus. My invention is shown in connection with a microscope of standard design and construction such as is used by scientists in micrometallographic work, but obviously the use of the invention is not limited to this or any other particular apparatus. In the accompanying drawing.

Fig. 1 is a diagrammatic view of a micrometallographic apparatus equipped with a locking device embodying the invention.

Fig. 2 is an enlarged front view of the apparatus with parts removed.

Fig. 3 is a plan view of the electromagnetic lock.

Fig. 4 is a view thereof in elevation.

Fig. 5 is a left hand end view of Figure 4.

As shown in Figure 1 the usual metallographic apparatus comprises a support 6 on which rests a camera 7, a microscope 8 and an illuminator or source of light 9. The numeral 10 designates the electromagnetic lock which receives current from a battery or other source 11. 12 is a switch to control the circuit.

Referring now more particularly to Figure 2, the numeral 13 denotes the stand of a standard microscope for metallographic purposes. 14 is the stage for supporting the specimen 15 to be photographed. 16 is the vertically movable frame for focussing the object, and which is moved by a rack 17 meshing with a pinion 18 in the usual manner by a coarse adjustment 19 having a lock 20, and then finely adjusted by a fine adjustment 21 operable by knobs 22 and 23.

Referring to Figure 3, the shaft 24, shown dotted, represents the shaft of the fine adjustment and to which shaft the operating knob or knobs are attached in the usual manner.

In accordance with the present invention, the one fine adjustment knob is made preferably integral with an iron brake wheel 25 so that the knob and the wheel may be conveniently attached as one unit to control the movements of the fine adjustment shaft 24.

The wheel has a double bevelled periphery 26 adapted to be engaged frictionally and firmly by the correspondingly recessed head 27 on the core 28 of an electromagnet 29. The latter is movably supported by a thin hanger 30 adapted to be pivoted to the microscope as shown at 31 in Figure 2. The electromagnet 29 is suspended within a protective casing 32 on a bracket 33. The terminal wires 34, 34 are secured to binding posts 35, 35 in the end of the casing.

The wires 34 are looped or flexed within the casing to permit free longitudinal movement of the electromagnet.

It will be seen, therefore, that the electromagnetic lock consists of two parts, namely an electromagnet adapted to act as a lock and a wheel adapted to be attached to the member (shaft 24) to be locked and which wheel is further adapted to act as an armature for the electromagnet.

The device is attached to the microscope in the manner shown in Figure 1. The armature unit 23—25 is secured to the fine adjustment shaft 24 and the electromagnet unit is mounted in operative relation thereto by suitably affixing the supporting bracket 33 and securing the pivot 31 so that the electromagnet will have a free movement within its protecting casing, after which the circuit is wired as shown in Figure 1.

The operation is as follows:—After the microscope has been focussed, first coarsely and then by the fine adjustment, the operator closes the switch 12 to close the circuit through the electromagnet 29 which then becomes energized and is attracted by the wheel 26. The electromagnet will instantly attach itself to the wheel, the head 27 fitting the same snugly. In fact, the wheel will itself become part of the magnet as is obvious, and the wheel will remain immovable so long as the current is on. Consequently the fine adjustment will remain locked during the operations. When the current is turned off, the fine adjustment may again be operated by turning the knob 23 and the electromagnet moves away a slight distance from the wheel due to greater weight of the magnet acting on the left hand side of the pivot at 31 in an obvious manner.

While the invention is shown applied to a microscope it is not limited thereto. It is usable for braking or locking a movable or stationary element within the practical scope of its capacity. It will also be understood that changes may be made within the scope of the appended claims without thereby departing from the principle of the invention.

I claim:—

1. In a microscope in combination a fine adjustment mechanism for focussing purposes including a shaft, a member secured to said shaft and comprising an operating knob and a wheel, a bracket secured to said microscope, an electromagnet mounted for movement into operative relation to the said wheel, means on said magnet adapted to engage said wheel, and means for energizing said electromagnet to cause it to be attracted by the wheel to lock it and the said shaft against rotary movement.

2. In a microscope in combination a fine adjustment mechanism for focussing purposes including a shaft, a wheel of magnetic material secured to said shaft, an electromagnet, means for pivotally suspending the same from the microscope in normally non-engaged relation with said wheel, a head on said electromagnet adapted to engage the periphery of the wheel and means for energizing said electromagnet to cause it to be attracted by the wheel to lock it and the said shaft against rotary movement.

ROBERT G. GUTHRIE.